US007553147B2

(12) United States Patent
Krämer

(10) Patent No.: US 7,553,147 B2
(45) Date of Patent: Jun. 30, 2009

(54) DIE TABLE FOR ROTARY TABLET PRESSES AND ROTARY TABLET PRESS

(75) Inventor: Hans Krämer, Köln (DE)

(73) Assignee: IMA Kilian GmbH & Co. KG, Koln (DE)

( * ) Notice: Subject to any disclaimer, the term of this patent is extended or adjusted under 35 U.S.C. 154(b) by 109 days.

(21) Appl. No.: 11/883,029

(22) PCT Filed: Jan. 5, 2006

(86) PCT No.: PCT/EP2006/000056

§ 371 (c)(1),
(2), (4) Date: Jul. 25, 2007

(87) PCT Pub. No.: WO2006/081908

PCT Pub. Date: Aug. 10, 2006

(65) Prior Publication Data

US 2008/0145468 A1 Jun. 19, 2008

(30) Foreign Application Priority Data

Jan. 31, 2005 (DE) .................. 20 2005 001 556 U

(51) Int. Cl.
*B29C 43/08* (2006.01)

(52) U.S. Cl. ....................... 425/193; 425/195; 425/345; 425/353

(58) Field of Classification Search ................. 425/193, 425/195, 345, 353
See application file for complete search history.

(56) References Cited

U.S. PATENT DOCUMENTS 5,843,488 A 12/1998 Korsch et al.
6,830,442 B2 * 12/2004 Cecil .......................... 425/107
7,118,367 B2 * 10/2006 Hinzpeter et al. ........... 425/193
2003/0101843 A1 6/2003 Hinzpeter et al.

FOREIGN PATENT DOCUMENTS

| | | |
|---|---|---|
| DE | 101 59 114 | 6/2003 |
| EP | 1 316 411 | 6/2003 |
| IT | 1238958 | 9/1993 |
| JP | 05131294 | 5/1993 |
| JP | 06071497 | 3/1994 |
| JP | 10305395 | 11/1998 |
| JP | 2001353597 | 12/2001 |
| JP | 2003311493 | 11/2003 |

OTHER PUBLICATIONS

International Search Report for International Application No. PCT/EP2006/000056.

* cited by examiner

*Primary Examiner*—Yogendra Gupta
*Assistant Examiner*—Thu Khanh T Nguyen
(74) *Attorney, Agent, or Firm*—Fay Sharpe LLP

(57) ABSTRACT

The invention relates to a die table (10), for a rotary tablet press, comprising a rotating rotor (1) formed from the die table (10), a punch guide (5) for the upper punch (7) and a punch guide (3) for the lower punch (4). The die table (10) comprises several exchangeable dies (11) arranged concentrically around the rotational axis of the rotor (1) and aligned with the upper and lower punches (7, 4). According to the invention, the short set-up times for changing the press to other die shapes may be achieved, whereby the die table (10) comprise at least two recesses (12) and an insert piece (20) is exchangeably inserted in each of the recesses (12) which comprises several dies (11).

20 Claims, 3 Drawing Sheets

DIE TABLE FOR ROTARY TABLET PRESSES AND ROTARY TABLET PRESS

The invention relates to a die table for a rotary tablet press which has a rotatable rotor which is formed by the die table, by a ram guide for upper rams and by a ram guide for lower rams, comprising a plurality of exchangeable dies which are arranged concentrically around the rotational axis of the rotor and are aligned with respect to the upper and lower rams in the respective ram guides. The invention also relates to corresponding rotary tablet presses.

Rotary tablet presses comprise rotors which can also be designed as exchangeable rotors and comprise, in addition to a die table, a guide for the upper rams and a guide for the lower rams. The upper and lower rams which are arranged in the ram guides are aligned axially parallel with respect to dies or die bores which are formed in the die table and in which the powder supplied to the rotary tablet press is shaped into a pellet by means of the ram. The ejection of the pellet is generally carried out by means of the lower ram, upward to the upper side of the die table. The cross section and the design of a die together with the stroke of the ram determine the contour of the pellet which is to be produced. Depending on the contour of the pellet and the composition of the powder which is to be compressed, the wear to the dies varies in intensity.

A die table usually contains a plurality of through bores, with each individual through bore either forming a die itself or forming a holding bore for a sleeve-shaped, exchangeable die (die sleeve). The number of rams used therefore corresponds to the number of dies or die sleeves which, in the event of servicing work or installation work, must be dismounted, serviced and/or mounted, with the exchangeable die sleeves usually being secured in the respective die holding bores in the die table by locking means which are screwed into radial bores. The maintenance effort for die tables with exchangeable die sleeves is correspondingly high.

DE 101 59 114 U1 discloses a rotor for a rotary tablet press in which the die table is composed of a plurality of table segments, with the assembled table segments forming the die table which is fastened in an exchangeable manner to the rotor. Formed in each table segment are a corresponding number of dies which are formed as die bores, so that therefore in the event of wear, it is no longer necessary to replace individual dies, but rather the entire die table is dismounted in segments and replaced with another segment-shaped die table. In the case of the die table which is composed of table segments, although the assembly effort is greater than in the case of conventional die tables which provide a separate bore for each individual die sleeve, the production costs for a corresponding die table are however disproportionately higher. At the same time, during the assembly of the individual ring segments to form the die table, great demands are made on the positional accuracy of the ring table segments relative to one another, since in the event of positional deviations, the upper surface of the die table has uneven portions, which excessively quickly destroy scrapers, sealing lips and other auxiliary means, for supplying the powder and discharging pressing dust or the like, used in the operation of the rotary tablet press.

It is an object of the invention to create a die table which, with short fitting times, can be re-tooled with dies having other contours for the pellets or with new dies for servicing and cleaning purposes.

Said object is achieved according to the invention in that the die table has at least two cutouts, and an insert piece, which comprises a plurality of dies, can be or is inserted in an exchangeable manner into each of said cutouts. With the solution according to the invention, therefore, the die table is not dismantled into ring segments but rather the die table is provided with cutouts where, in conventional tables, the individual bores for holding the die sleeves are seated, with said cutouts subsequently being filled by means of insert pieces in which the dies are formed and which form the support bodies for the dies. The exchange of the insert pieces is significantly easier then the exchange of ring segments, since the latter must be fixed with fitting accuracy to the rotor and have a considerably higher weight then small-format insert pieces. It is self-evident that the insert pieces should end in each case flush with the upper side of the die table in order to avoid wear edges for scrapers or the like.

In one preferred embodiment, the die table has two to nine cutouts, in particular three to five cutouts for insert pieces. Here, each insert piece can comprise five to fifteen dies or form the support for five to fifteen dies. It is particularly advantageous if the cutouts extend in the shape of a circular arc and/or are of substantially kidney-shaped design. It is self-evident that the insert pieces are of correspondingly complementary design such that they can be inserted into the cutouts. Particularly favorable fixing of each insert piece is given if each cutout has a peripherally closed edge. It is particularly advantageous if the cutouts are provided in the die table (only) adjacent to the upper side of the die table with a fitting surface for the insertion of the insert pieces with fitting accuracy. Here, the fitting surface can preferably be formed only by the upper peripheral edge of the cutouts. The fitting surfaces ensure the positional accuracy and axial parallelism of the central axes of the dies with respect to the axes of the guides in the ram guide rings, and at the same time prevent pressing dust or powder from accumulating in the seams between the peripheral edge of the insert pieces and the delimitations of the cutouts. By delimiting the fitting surface to a partial section of the depth of the cutouts, the production costs for the die table with cutouts for the insertion of the insert pieces with fitting accuracy can be further reduced. In the case in particular of an embodiment of a die table having cutouts with a fitting surface only in the upper region, the cutouts can increase in size, and/or widen beneath the fitting surface, toward the underside of the die table, and therefore toward the lower ram guide side.

The insert pieces which can be placed into the cutouts are preferably composed of substantially circular-arc-shaped and/or kidney-shaped ring segments. In one advantageous embodiment, each insert piece can be directly provided with a plurality of through bores which form the dies. In this embodiment, the dies are therefore formed directly in the insert pieces. It is then possible for the insert pieces to use a wear-resistant material which is suitable for dies, such as hardened steel, carbide or ceramic, with the material of the die table in any case remaining at transition webs between two cutouts. Since substantially only the cutouts in the die table are filled by means of the insert pieces, it is possible without cost disadvantages to use even high-quality material for the insert pieces, while the die table itself is composed of more cost-effective material. According to an alternative advantageous embodiment, the die table can be provided on the upper side with a concentrically encircling groove, with the groove base being composed substantially of the cutouts and radial webs which are arranged between said cutouts. In this embodiment, insert pieces can be used which directly adjoin one another at the upper side of the die table, so that a concentric strip is formed within the upper side of the die table by means of the insert pieces.

It is also preferably possible for the insert pieces to have a side face at the inside of the arc and a side face at the outside of the arc, with an assembly web being formed at least on the side face at the inside of the arc. The assembly web is expediently arranged centrally between an upper side and a lower side of the insert pieces. This has the advantage that the insert pieces can, after a rotation through 180°, that is to say after exchanging the upper and lower sides with one another, be re-mounted on the die table, thereby approximately doubling the overall service life of the dies in the insert pieces, with in turn extremely short fitting times.

Fastening means or centering means preferably serve for mounting the insert pieces on the die table, which fastening means or centering means can particularly advantageously extend through the assembly web and be fixed or screwed to the die table. It is particularly advantageous if the insert pieces are fastened to the lower side of the die table, since no scrapers or the like run past on the lower side of the die table and, in addition, the greater forces during the pressing process are applied by the lower rams, by means of which the pellets are ejected upward at the end of the pressing process.

It is alternatively or additionally possible for the die table to have radial bores or transverse bores which open out into the cutouts. This offers the particular advantage that, in order to lock the insert pieces, a small number of locking means such as locking pins or locking screws can be screwed or inserted into the radial bores or transverse bores in the die table proceeding from the peripheral edge of the die table. If appropriate, 2 to 4 locking means are sufficient for locking an insert piece.

It is alternatively or additionally possible for the insert pieces to be fastened relative to the die table by means of bar elements which are buttressed on the rotor. The bar elements can in particular engage in recesses on the lower ram guide.

Further advantages and embodiments of the invention can be gathered from the following description of an exemplary embodiment which is shown schematically in the drawing, in which.

Figure 1:
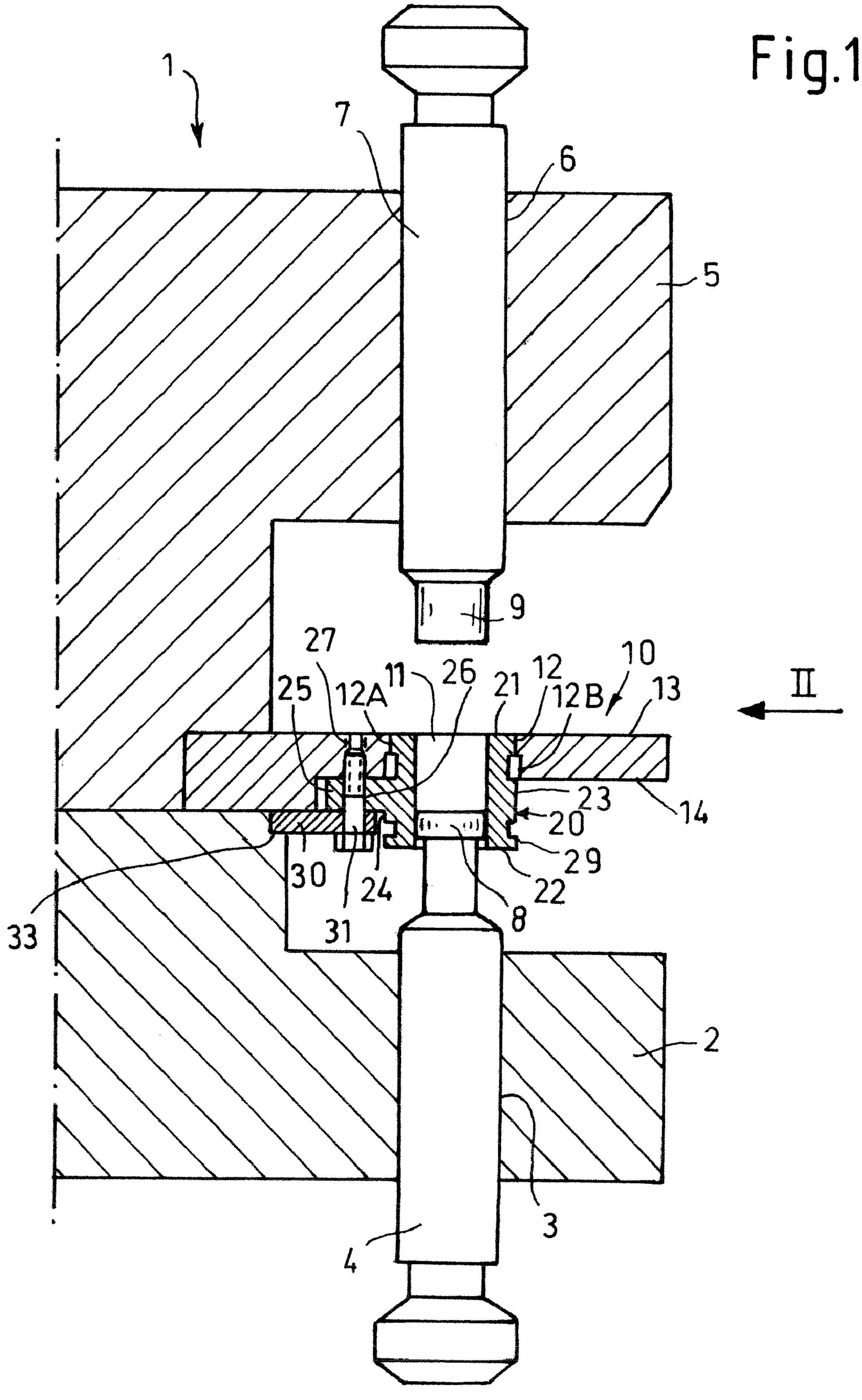
FIG. 1 shows a side view of a partial region of a rotor having a die table according to the invention and rams arranged in the ram guides.
Figure 2:
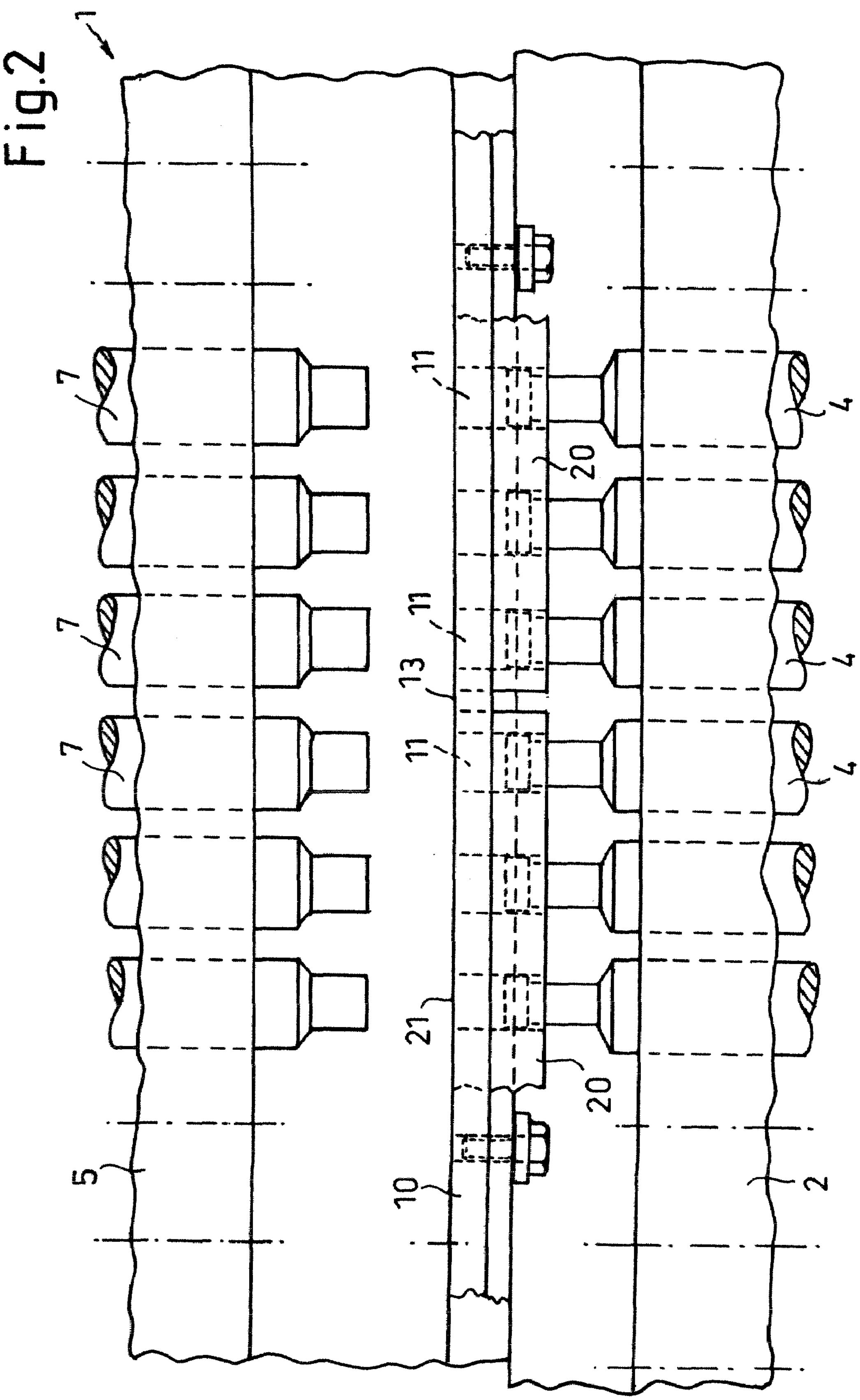
FIG. 2 shows a side view of the rotor as per II in FIG. 1, partially in section.

FIGS. 1 and 2 show a rotor 1, which is rotatable about the rotational axis of a rotary tablet press (not illustrated in any more detail), in a schematic and highly simplified form. The rotor 1 comprises a lower ram guide ring 2 with numerous ram guide bores 3, arranged concentrically around the rotational axis of the rotor 1, for lower rams 4, a further, upper ram guide ring 5 with numerous guide bores 6 for upper rams 7, and a die table 10 which is mounted in an exchangeable manner in a way known per se for example at the transition between the lower ram guide ring 2 and the upper ram guide ring 5. It can be clearly seen from FIG. 1 that the lower ram 4 and the upper ram 7 in their respective guide bores 3 and 6 are aligned so as to be flush with one another, so that the ram shafts, which move up and down in a sliding fashion, of the rams 4, 7 dip with their pressing heads 8 and 9 into a die 11 in which a pellet is pressed by means of the rams 4, 7. The stroke movement of the rams 4, 7 is effected by means of slide rails (not illustrated) which serve as control cams and along which the rams slide with their ends as the rotor 1 rotates. In FIG. 2, however, all of the rams 4, 7 are illustrated in the initial position.

Each die 11, which can be composed in particular of a die bore, is a constituent part of an insert piece 20 which has an upper side 21, a lower side 22, an outer side face 23 and an inner side face 24, with an assembly web 25 being integrally formed on the inner side face 24 centrally between the upper and lower sides 21, 22, by means of which assembly web 25 the insert piece 20 is fixed by means of a bar element 30 to the ram guide ring 2 for the lower ram 3, as will be explained below.

Figure 3:
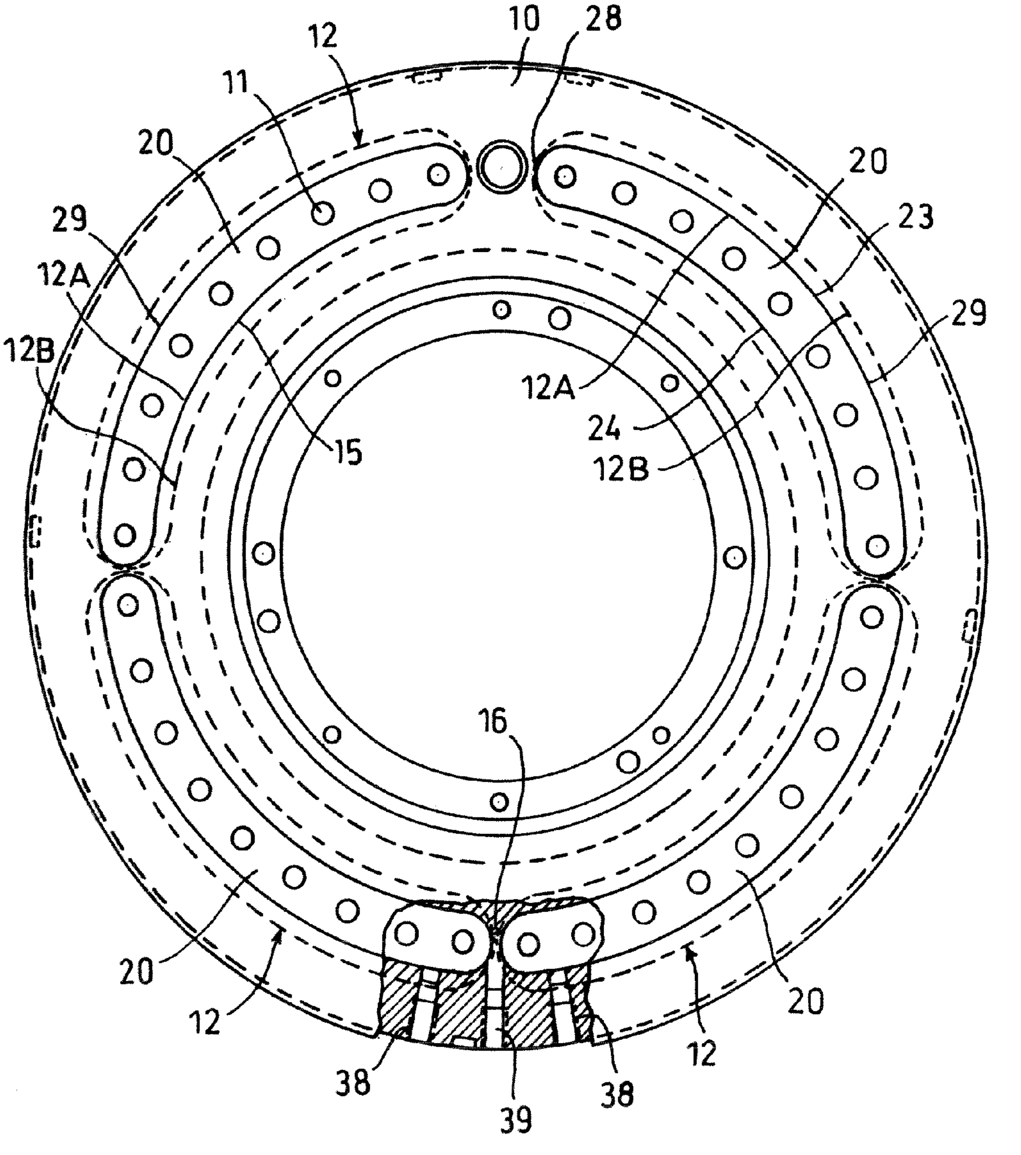
FIG. 3 schematically shows a plan view of the upper side of a die table according to the invention, partially in section.

It can be seen in particular from FIGS. 2 and 3 that each insert piece 20 extends in the shape of a circular arc over approximately 90° here and comprises in each case a plurality (nine in the exemplary embodiment shown) of dies 11. Each insert piece 20 having the plurality of dies 11 is inserted here in an associated cutout 12 within the die table 10, with the four cutouts 12 here extending continuously between the upper side 13, which faces toward the upper ram guide ring 5, of the die table 10 and the lower side 14, which faces toward the lower ram guide ring 2, of the die table 10. The insert pieces 20 having the plurality of dies 11 are inserted into the cutouts 12 in such a way that, as shown in particular in FIGS. 1 and 2, the upper side 21 of the insert pieces 20 ends flush and plane-parallel with the upper side 13 of the die table 10, while the insert pieces 20 at the same time project far beyond the lower side 14 of the die table 10 and bear a really with the centrally integrally formed assembly web 25 against the lower side 14 of the die table 10, such that the forces which are applied by means of the lower ram 3 to the insert pieces 20 when pressing a pellet out of the die 11 are absorbed by means of the assembly web 25 and dissipated into the die table 10 and its fastening to the rotor 1.

In the exemplary embodiment shown, the cutouts 20 extend in each case as circular-arc-shaped curved groove strips, with a peripherally closed edge 15, on the upper side 13 of the die table 10, and the complementarily-formed insert pieces 20 are likewise composed of circular-arc-shaped curved, web-shaped or strip-shaped ring segments, with arc-shaped side faces 23, 24 and rounded ends 28, which are inserted from below into the cutouts 12. Here, FIG. 1 shows that that partial section 12A of the cutout 12 which adjoins the upper side 13 of the die table 10 has a smaller free cross section than the lower section 12B which extends to the lower side 14, since the cutouts 12 widen downward by means of a step. The upper partial section 12A is machined as a fitting surface into which the insert piece 20 dips with fitting accuracy with the edge face of the peripheral edge 29 which directly adjoins in each case the lower side 22 or upper side 21.

The design of the die table 10 according to the invention having insert pieces 20, with each insert piece 20 being provided with a plurality of dies 11, offers the advantage that, by exchanging one insert piece 20, a plurality of dies are immediately exchanged in order to replace the total, in the exemplary embodiment shown, of four insert pieces 20 in the four cutouts 12 with other insert pieces 20. The design of the insert pieces 20 with a symmetrical construction relative to the assembly limb 25 offers the further advantage that the insert pieces 20 can be rotated through 180° and can then be inserted into the cutouts 12 again.

The centering of the insert pieces 20 in the cutouts 12 takes place by means of combined centering and locking bolts 31 which extend through centering bores 26 in the assembly limb 25 and if appropriate also in the bar elements 30, and are screwed into blind holes 27 which lie parallel with respect to the bore axes of the dies 11. The bar elements 30 can be buttressed on the rotor in a suitable way, for example in recesses 33 in the lower ram guide ring 2, in order to assist the support of the insert pieces 20. It is possible for in particular approximately 4 to 6 bar elements 30 to be provided for each insert piece 20.

As additional locking for the insert pieces 20, the die table 10 is provided with radial bores 38 shown in FIG. 3, which radial bores 38 open out into the cutouts 12, and with radial bores 39 which extend into an intermediate web 16 between two cutouts 12. Locking pins can be screwed into the radial bores 38 and 39, with the locking pins which are screwed into the radial bores 38 extending into corresponding transverse bores in the insert pieces 20, while the locking pins which are screwed into the radial bores 39 extend for example into positioning notches at the peripheral edge of two adjacent insert pieces 20 in order to ensure their flush positioning with respect to one another and with respect to the die table upper side 13.

To a person skilled in the art, numerous modifications can be envisaged from the preceding description which should fall within the scope of protection of the dependent claims. An exemplary embodiment with four insert pieces lends itself to use in particular with a total of thirty-six dies or die bores. With fewer dies, it would also be possible to use only three insert pieces; with a considerably higher number of dies, it would also be possible to use five or six insert pieces and a corresponding number of cutouts. The edges, which adjoin one another, of the insert pieces could also engage into one another, for which purpose the die table is then provided with a concentrically encircling groove so that the surfaces of the insert pieces again end flush with the upper side of the die table. Instead of insert pieces with integral dies formed by through bores, the insert pieces could also be provided with individual exchangeable inserts such as die sleeves or the like. The assembly web could (additionally) also be formed on the outer side face in order to introduce the forces applied by the lower rams into the die table at both sides of the cutouts. It would also be possible for magnets, in particular supermagnets such as neodymium magnets or the like, to be fastened as assembly aids within the cutouts in the die table and/or on the insert pieces, in order to hold the insert pieces in the assembly position within the cutouts while the fastening means for the insert pieces are mounted and tightened. The servicing personnel carrying out the change of the insert pieces then has both hands free for mounting and tightening the fastening means, since the insert pieces are held within the cutouts in a simple way.

The invention claimed is:

1. A die table for a rotary tablet press which has a rotatable rotor which is formed by the die table, by a ram guide for upper rams and by a ram guide for lower rams, comprising a plurality of exchangeable dies which are arranged on a circular path around the rotational axis of the rotor and are aligned with respect to the upper and lower rams, wherein the die table (10) has at least two cutouts (12), and into each of said cutouts (12) an insert piece (20), which comprises a plurality of dies (11), can be or is inserted in an exchangeable manner.

2. The die table as claimed in claim 1, wherein the die table (10) has two to nine cutouts (12), in particular three to five cutouts for insert pieces.

3. The die table as claimed in claim 1, wherein each insert piece (20) comprises five to fifteen dies (11).

4. The die table as claimed in claim 1, wherein the cutouts (12) extend in the shape of a circular arc and/or are of substantially kidney-shaped design.

5. The die table as claimed in claim 1, wherein each cutout (12) has a peripherally closed edge (15).

6. The die table as claimed in claim 1, wherein the cutouts (12) are provided in the die table (10) adjacent to the upper side (13) of the die table (10) with a fitting surface (12A) for the insertion of the insert pieces (20) with fitting accuracy, with the fitting surface (12A) preferably being formed by the upper peripheral edge of the cutout (12).

7. The die table as claimed in claim 1, wherein the cutouts (12) increase in size, and/or widen beneath the fitting surface (12A), toward the lower ram guide side.

8. The die table as claimed in claim 1, wherein the insert pieces (20) are composed of circular-arc-shaped and/or kidney-shaped ring segments or ring segment strips.

9. The die table as claimed in claim 1, wherein each insert piece (20) is directly provided with a plurality of through bores which form the dies (11).

10. The die table as claimed in claim 1, wherein the die table is provided on the upper side with a concentrically encircling groove, with the groove base being composed substantially of the cutouts and radial webs which are arranged between said cutouts.

11. The die table as claimed in claim 1, wherein the insert pieces (20) have a side face (24) at the inside of the arc and a side face (23) at the outside of the arc, with an assembly web (25) being formed on the side face (24) at the inside of the arc.

12. The die table as claimed in claim 11, wherein the assembly web (25) is arranged centrally between an upper side (21) and a lower side (22) of the insert pieces (20).

13. The die table as claimed in claim 11, wherein fastening means/centering means (31) for fastening/centering the insert pieces extend through the assembly web (25) and can be fixed to the die table (10).

14. The die table as claimed in claim 1, wherein the insert pieces (20) are fastened to the lower side (14) of the die table (10).

15. The die table as claimed in claim 1, wherein the die table has radial bores (38) or transverse bores which open out into the cutouts (12).

16. The die table as claimed in claim 15, wherein, in order to lock the insert pieces (20), locking means such as locking pins or locking screws can be screwed or inserted into the radial bores (38) or transverse bores in the die table proceeding from the peripheral edge of the die table (10).

17. The die table as claimed in claim 1, wherein the insert pieces (20) are fastened to the die table (10) by means of bar elements (30) which are buttressed on the rotor (1).

18. The die table as claimed in claim 17, wherein the bar elements (30) engage in recesses (33) on the lower ram guide (2).

19. A rotary tablet press having a rotatable rotor which is formed by a die table, by a ram guide for an upper ram and by a ram guide for a lower ram, wherein the die table (10) comprises:

- a plurality of exchangeable dies which are arranged on a circular path around a rotational axis of a rotor and which are aligned with respect to the upper and lower rams;
- at least two cutouts (12);
- an insert piece (20) comprising a plurality of dies (11) which adapted to be inserted in an exchangeable manner into the cutouts.

20. A die table for a rotary tablet press, said die table comprising:

- at least first and second cutouts defined in the die table;
- at least first and second insert pieces releasably secured respectively in said first and second cutouts;
- wherein said first and second insert pieces each comprise a plurality of dies.

* * * * *